INVENTOR
*Herman T. Kraft*

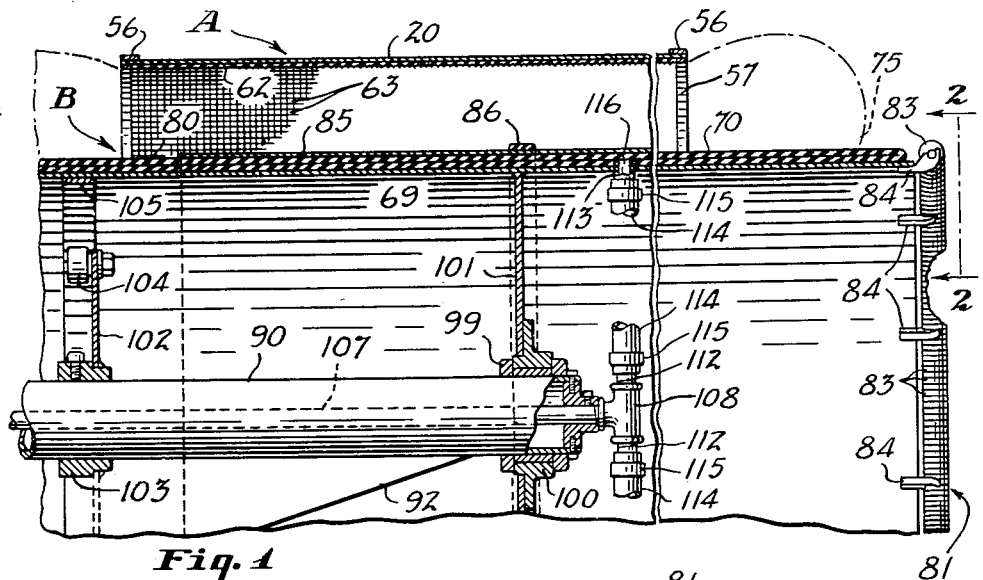
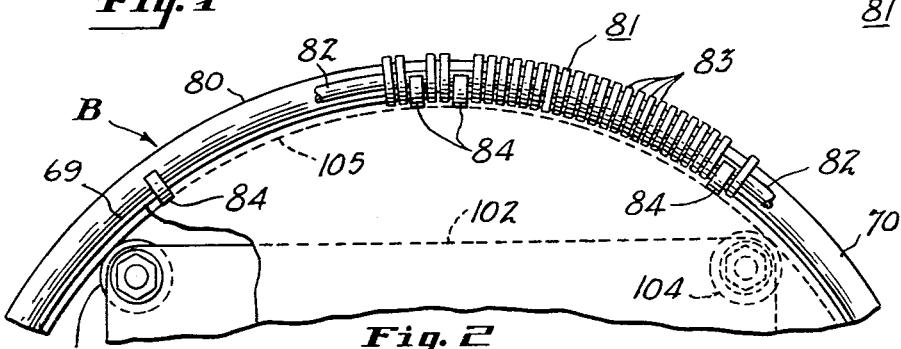
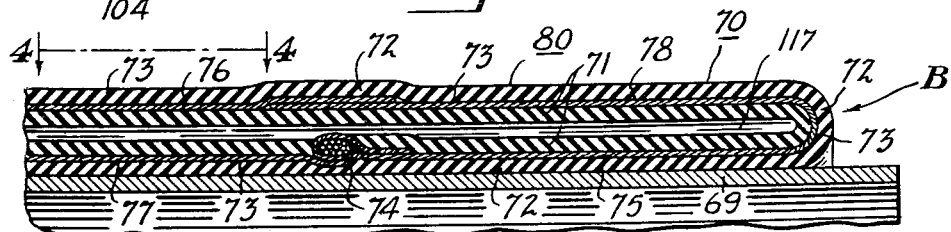
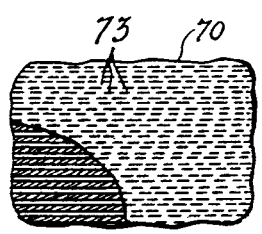
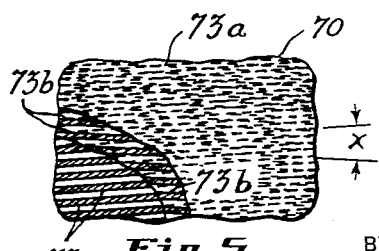
INVENTOR
Herman T. Kraft
ATTORNEYS Jan. 23, 1962  H. T. KRAFT  3,018,213
EXPANSIBLE BAG
Filed June 4, 1958  3 Sheets-Sheet 2
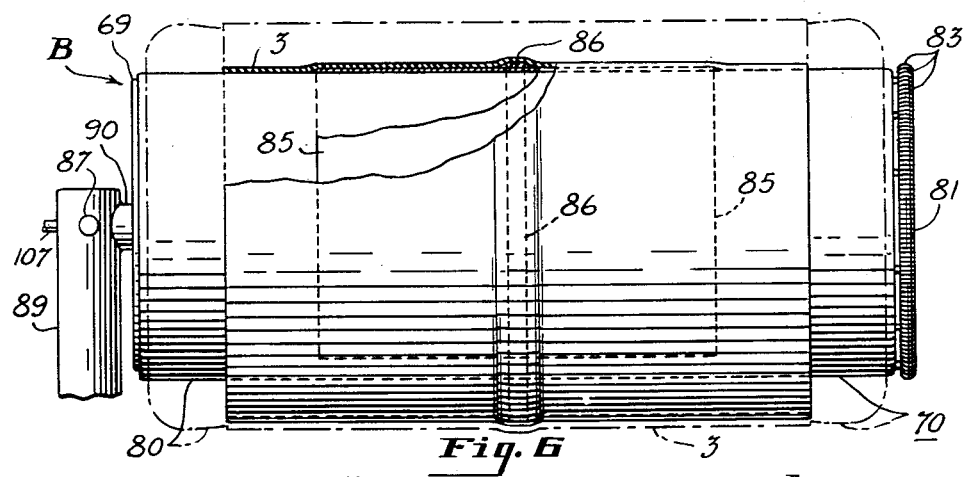
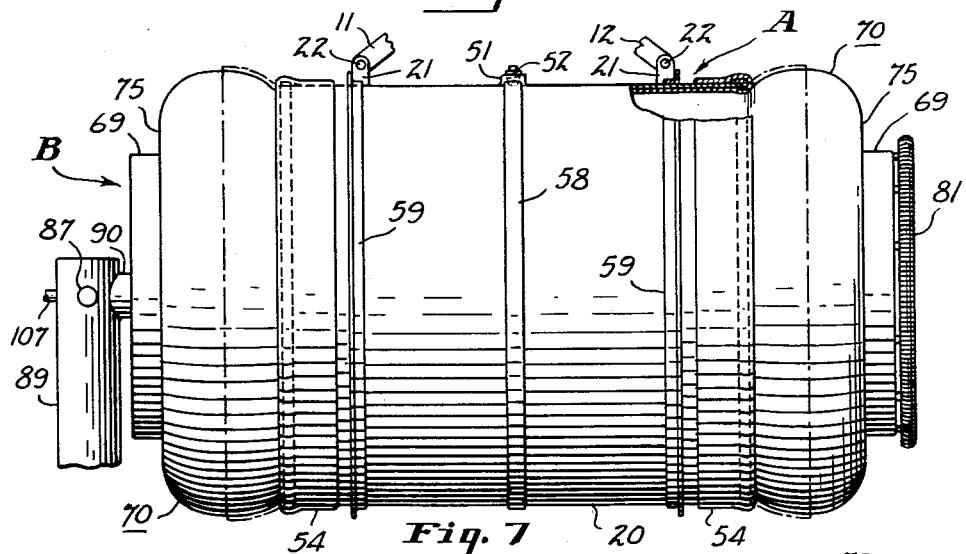
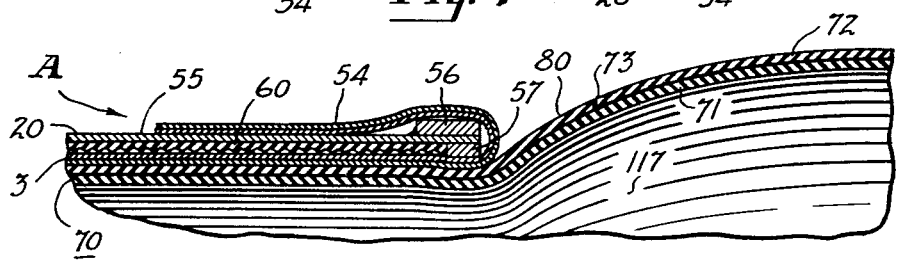
INVENTOR
*Herman T. Kraft*
BY McCoy, Greene + Te Grotenhuis
ATTORNEYS Jan. 23, 1962  H. T. KRAFT  3,018,213
EXPANSIBLE BAG
Filed June 4, 1958  3 Sheets-Sheet 3

BY
*McCoy, Greene + te Grotenhuis*
ATTORNEYS

United States Patent Office 3,018,213
Patented Jan. 23, 1962

3,018,213
EXPANSIBLE BAG
Herman T. Kraft, Akron, Ohio, assignor to The General Tire & Rubber Company, Akron, Ohio, a corporation of Ohio
Filed June 4, 1958, Ser. No. 739,869
17 Claims. (Cl. 156—416)

The present invention relates to a radially expansible tube or bag and more particularly to a bag of elastomeric material which retains a cylindrical shape as it is expanded and contracted.

Expansible bags known prior to the invention have bulged radially outwardly at their medial plane when expanded due to their tendency to assume a toroidal shape. Such bags could not maintain a cylindrical shape when they were expanded and contracted.

According to the present invention, a radially expansible cylindrical tube or bag is provided having axially extending reinforcing cords, the elastic walls of the bag being free of circumferentially extending cords so that they can expand radially. Bead rings are provided to anchor the cords and the opposite end portions of the bag to a cylindrical supporting member. When the bag is expanded, its axial length is several times (usually at least 5 times) the radial depth of the bag. For some reason, the bag retains a cylindrical shape as it is expanded and contracted.

Best results are obtained where the reinforcing cords extend axially the full length of the bag and the end portions of the bag extend a substantial distance axially outwardly beyond the bead rings, but satisfactory results may also be obtained where the central portion of the bag has a relatively thick tread portion free of fabric reinforcement.

An object of the invention is to provide an expansible cylindrical drum for supporting bands of tire cord fabric.

A further object of the invention is to provide a simple inexpensive fabric-reinforced elastic bag which retains a cylindrical shape as it is expanded and contracted.

Other objects, uses and advantages of the invention will become apparent from the following description and claims and from the drawings, in which:

FIGURE 1 is a fragmentary longitudinal sectional view on a reduced scale with parts broken away taken through the axis of a rotatable band-holding drum, said drum containing an inflation tube according to the present invention which tube is shown in solid lines in its deflated position and in dot-dash lines in an inflated position;

FIGURE 2 is a fragmentary end view of the band-holding drum taken substantially on the line 2—2 of FIG. 1 and on a larger scale with parts omitted and parts broken away;

FIGURE 3 is a fragmentary longitudinnal vertical sectional view with parts omitted similar to FIG. 1 and on a larger scale showing the construction of the inflation tube or bag;

FIGURE 4 is a fragmentary view of the bag taken on the line 4—4 of FIG. 3 and on the same scale showing the arrangement of the longitudinal reinforcing cords;

FIGURE 5 is a fragmentary view similar to FIG. 4 of a modified form of inflation bag wherein the reinforcing cords cross at a small angle indicated by the dot-dash lines, the inflation bag of FIG. 5 having the same cross section as shown in FIG. 3;

FIGURE 6 is a side elevational view on a reduced scale with parts broken away and shown in section showing an elastic fabric band in place on the expansible band-holding drum;

FIGURE 7 is a fragmentary side elevational view similar to FIG. 6 and on the same scale with parts broken away and shown in section showing the band-holding drum within the transfer cylinder with its inflation tube expanded and the end portions of the band cuffed over the ends of the transfer cylinder;

FIGURE 8 is a fragmentary longitudinal vertical sectional view showing portions of the band-holding drum and transfer cylinder on a larger scale;

Figure 9:
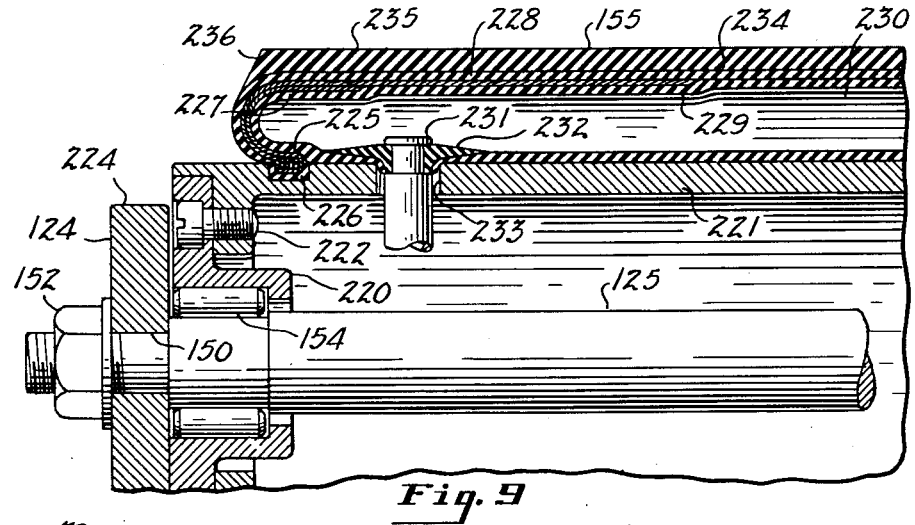
FIGURE 9 is a fragmentary longitudinal vertical sectional view on a reduced scale showing a modified form of expansible bag according to the present invention.

Referring more particularly to the drawings, in which like parts are identified by the same numerals throughout the several views, FIGS. 1 to 8 show a band applying apparatus which is described in more detail in my copending application Serial No. 573,850, now Patent No. 2,871,912. The apparatus includes a transfer cylinder A with an internal knurled surface 62 and an expansible band-holding drum B for expanding the preformed elastic band against the transfer cylinder. The cylinder A and the drum B are employed to assist in the mounting of fabric bands on a conventional tire-building drum during the forming of a tire on the tire-building drum. The transfer cylinder A is of an internal diameter somewhat greater than that of the tire-building drum and greater than that of the preformed elastic band 3 that is to be transferred to the drum so that the band may be readily positioned within the cylinder and expanded against the cylinder and so that the cylinder may readily be moved axially to a position wherein the tire-building drum is within the cylinder A and the band 3 carried thereby. The elasticity of the expanded uncured band causes it to snap inwardly out of engagement with the cylinder and into tight engagement with the drum or the material on the drum so that the transfer cylinder may be retracted from the drum. The cylinder A has an open end to receive the tire-building drum and an open end to receive the expansible band-holding drum B, both ends preferably being open so that the cylinder may be moved axially from the band-holding drum to the tire-building drum without swinging the cylinder axis or moving it laterally.

The transfer cylinder A is preferably mounted on a suitable carriage or support for movement between a receiving position surrounding the band-holding drum B and a discharge position surrounding the tire-building drum. A three-wheeled truck or any other suitable means may be provided for guiding the transfer cylinder in its movements between these positions. Such means may include, for example, trolley means guided by a track runway as disclosed in more detail in the aforesaid Patent No. 2,871,912.

The rigid outer cylindrical metal shell 20 of the transfer cylinder A has a pair of aligned yokes or lugs 21 welded thereto at the top of the cylinder to permit attachment of supporting bars 11 and 12, each yoke being spaced several inches from an end of the transfer cylinder and having aligned circular openings therein for receiving a horizontal pivot pin or bolt 22.

The transfer cylinder A has an internal circumference greater than the normal circumference of the preformed elastic band to be applied to the tire building drum so that the band must be stretched and expanded against the interior surface of the transfer cylinder.

A preformed elastic band may be held by means of air pressure in its expanded position against the interior of the transfer cylinder while it is being positioned around the tire-building drum without rotating the cylinder. An air pressure differential between the radially inner and outer surfaces of the elastic band sufficient to hold the band in its expanded position against the interior of the transfer cylinder may be maintained during axial movement of the transfer cylinder relative to the tire-building drum by excluding air from between the band and the interior surface of the transfer cylinder.

As herein shown, the outer cylindrical metal shell 20 of the transfer cylinder A has an annular boss 51 welded thereto which is internally threaded for connection to a suction conduit whereby a suction pump may be connected by a flexible hose or conduit to the transfer cylinder. A circular opening is provided in the transfer cylinder leading radially through the boss 51 to the interior of the cylinder so that air may flow from the interior of the cylinder through the boss 51 to the suction conduit. This opening is sealed by an externally threaded plug 52 which is screwed into the boss 51 when the suction pump is not being used. Because of the knurled surface 62 of the transfer cylinder A it is unnecessary to provide suction as is explained in more detail in said Patent No. 2,871,912. As herein shown, the transfer cylinder A is constructed so that the opposite end portions of the unvulcanized 2-ply elastic fabric band 3 may be turned radially outwardly and axially inwardly over the ends of the cylinder to form cuffs 54 having an axial width of several inches, the center of each lug 21 preferably being spaced more than six inches from the nearest end of the cylinder A to permit forming a cuff of substantial width at each end of the cylinder.

The thin metal shell 20 of the cylinder shown herein is in the form of a right circular cylinder and has a smooth cylindrical outer surface 55. The opposite ends of the shell are reinforced by annular outer metal rings 56 of uniform rectangular cross section and annular inner metal rings 57 of uniform rectangular cross section. Both ends of each ring 56 and 57 is rigidly connected to the shell 20 by suitable tack welds. A central ring 58 of the rectangular cross section and a pair of annular angles 59 of L-shaped cross section are also welded to the shell 20 to reinforce the same.

When the end portions of the unvulcanized band 3 are turned over the end portions of the transfer cylinder A, the entry of air between the band and the cylinder may be prevented and the necessary partial vacuum may be maintained.

As herein shown, the interior cylindrical surface of the metal shell 20 between the rings 57 is completely covered by a cylinder 60 which is bonded to the shell by a layer of cement. The cylinder may have a uniform cross section and a generally cylindrical knurled inner surface 62 formed by aligned rows of pyramids 63 of the same size and shape.

The two-ply rubber-coated fabric band 3 is expanded uniformly by fluid pressure against the knurled internal surface 62 of the transfer cylinder. The pressure may be applied uniformly using one or more inflatable bags or tubes of the type shown in my U.S. Patent No. 2,838,091 and in FIG 9 of the present application. Such bags retain a generally cylindrical shape while they are expanded and contracted.

The most practical type of expansible band-holding drum employs only one tube or bag which has an axial length greater than that of the transfer cylinder. The expansible drum B shown herein is of this type. This drum comprises a rigid rotatable metal cylinder 69 of uniform radial thickness having an axial length more than five times its radius and an annular inflatable tube or bag 70 mounted on said cylinder and extending substantially the full length of the cylinder. The tube 70 of the present invention, in the normal unstressed deflated condition, comprises concentric cylindrical inner and outer parts integrally joined near the opposite ends of the cylinder 69 and spaced apart a distance not substantially greater than the radial thickness of the outer part. Said inner and outer parts are formed by inner and outer tubular elastic impervious vulcanized rubber layers 71 and 72 of substantially uniform thickness and a multiplicity of closely spaced reinforcing cords 73 sandwiched between and integrally joined to said layers.

The reinforcing cords may be held in parallel relation by weak weft threads which will break as soon as the tube is inflated or may be conventional weftless fabric. One or two plies of fabric reinforcement may be employed, but the cords are arranged generally parallel to the axis of the cylinder 69 so that they do not interfere with radial expansion of the tube.

FIGURE 4 shows the preferred construction wherein all the cords 73 are parallel to the axis of the cylinder 69. As will be apparent from the drawings, the cords 73 extend axially completely around the tube and are closely spaced around the circumference of the tube. As shown, there are in the neighborhood of thirty cords 73 per inch of circumference, but the spacing of the cords obviously may vary substantially.

FIGURE 5 shows a modified form which could be employed wherein two plies of fabric are vulcanized between the tubular layers 71 and 72. The first ply is made up of parallel cords 73a and the second ply is made up of parallel cords 73b which cross the former cords at a small angle $x$ as indicated in FIG. 5. This angle may be five degrees or so without there being any undue resistance to radial expansion. Where the fabric is cut at an angle of 88°, the cords 73a and 73b can be substantially parallel to the cylinder axis since the angle between the cords and said axis is only two degrees or so.

The inner part of the annular tube 70 is held against the cylinder 69 by a pair of inextensible metal bead rings 74 which are spaced from the ends of the deflated tube a distance substantially less than one-sixth the axial length of the tube. The end portions 75 of said inner part are disconnected from the cylinder 69 axially outwardly of said bead rings so that they are free to move away from said cylinder when the tube is inflated to permit the radial expansion necessary to press the band 3 against the transfer cylinder. As herein shown, the center of each bead ring 74 is about four inches from the end of the cylinder 69 and about three and one-half inches from the end of the deflated tube 70, but it will be obvious that this distance will vary depending on the amount of radial expansion desired.

The reinforcing cords 73 may be mounted in the tube 70 in various ways, the following description being by way of illustration rather than limitation. The tube shown herein is made from long single-ply fabric strips 76 and 77 and short single-ply end strips 78 which overlap the longer strips near the vertical planes containing the bead rings 74, said strips having about 32 cord ends per inch of width. The long strips and the cords 73 thereof have a length of more than six feet and extend most of the length of the cylinder 69, the end strips 78 being wrapped around the bead rings as shown in FIG. 3 and extending around the ends of the tube to the outer strips 76 so that the tube is reinforced throughout its length and circumference by the longitudinal cords 73.

The outer surface 80 of the tube 70 is cylindrical when the tube is deflated as shown in FIG. 6 and has a diameter several inches less than that of the band 3 so that the band may readily be slipped over said surface to the position shown in FIG. 6. Said outer surface 80 remains generally cylindrical as the tube is inflated to a diameter corresponding to that of the transfer cylinder due to the construction of the tube even if said surface is not subjected to external forces from a metal shell. This is quite different from ordinary vehicle tires which become toroidal when they are inflated. The ability of the tube 70 to retain a generally cylindrical shape when inflated appears to some extent to be due to the length of the tube. It will be noted that the tube has an axial length many times its radial height even when the tube is inflated. As herein shown, the tube 70 when deflated has a radial height less than one-tenth its axial length and when inflated against the transfer cylinder A has a radial height less than one-sixth its axial length.

If desired, means may be provided to facilitate mounting of the band 3 on the band-holding drum B. Such means may take the form of a metal garter spring or other toroidal ring mounted on the end of the cylinder 69 to reduce the friction between the drum and the band when the weight of the band is supported by the drum. However, better results are obtained by mounting rollers on the projecting end of the cylinder 69. As herein shown, a toroidal ring 81 is mounted on the cylinder which comprises a metal rod 82 of circular cross section which is bent to a circular shape and a multiplicity of flat wooden rollers 83 of uniform thickness closely spaced throughout the circumference of the rod and mounted for rotation on said rod. A series of circumferentially spaced holders 84 are welded to the inner surface of the cylinder 69 to support the rod, said holders having holes therein of a size to receive the rod so that the rod is held concentric to the cylinder as best shown in FIG. 5. The rollers 83 extend radially outwardly a short distance beyond the surface 80 of the deflated tube 70 and provide a generally toroidal supporting surface having an external diameter greater than that of the deflated tube. These rollers do not provide any substantial frictional resistance and greatly facilitate mounting of the band 3 on the tube.

The friction involved during mounting of the band may be further reduced by providing a smooth hard surface on the outside of the tube 70, but this is not essential. The tube may be covered with a thin expansible metal shell or the like to reduce the friction. As herein shown, the upper central portion of the tube is covered with a thin smooth imperforate metal sheet 85 of rectangular shape which is bent to a cylindrical shape to fit on the outer surface 80 of the tube. This sheet extends about three-fourths of the way around the tube and has an axial length about half that of the cylinder 69. An endless elastic rubber band 86 having a normal circumference less than that of the deflated tube 70 is mounted on the sheet 85 to hold the sheet in its desired position against the tube as shown in FIG. 6. This band permits expansion and contraction of the sheet 85 with the tube 70 and does not interfere with movement of the band 3 over the tube. It will be understood that the apparatus will function effectively without the sheet 85 and the band 86 and that these parts may be removed. The tube 70 will retain a generally cylindrical shape during expansion where the sheet 86 is removed.

The drum B is rotatably mounted in cantilever fashion so that it can be turned manually to perform this method about 180° to reduce the unevenness in the spacing of the tire cords. The cantilever support may be a permanent stationary support bolted to the floor or may be portable so that the drum B may be moved to another tire-building drum whenever it is desirable to rearrange equipment.

The supporting means for the drum B includes a horizontal tubular steel cantilever arm 90 which is welded to a vertical standard 89 and to a vertical gusset plate 92. A pair of horizontal bars 87 are mounted on the standard to provide handle grips. These elements are part of a three-wheeled hand truck as disclosed in said Patent No. 2,871,912.

Bearing means are provided for supporting the metal cylinder 69 so that it may rotate through an angle of at least 180°. As herein shown, an annular bearing 99 is mounted at the end of the tube 90 concentric to the tube and has an annular hub 100 mounted for rotation thereon. A flat circular plate 101 having an external diameter corresponding to the internal diameter of the cylinder 69 is welded to said cylinder and to the hub 100 in a vertical position perpendicular to the cylinder axis so that the hub and the cylinder remain coaxial with the tube 90 during rotary movements of the drum B.

The other end of the drum B must be supported in a different manner because of the gusset plate 92. A flat substantially square plate 102 is welded to an annular hub member 103 having an internal diameter corresponding to the external diameter of the tube 90, and said plate and said tube are slotted to fit over the gusset plate 92. The hub 103 is then rigidly mounted on the tube 90 to hold the plate perpendicular to the axis of the tube. A series of externally cylindrical anti-friction rollers 104 are mounted on the corner portions of the plate 102 for rotation about horizontal axes parallel to and spaced equal distances from the axis of the tube 90. These rollers engage the smooth interior cylindrical surface of a metal bearing ring 105 having an external diameter corresponding to the internal diameter of the cylinder 69 so as to hold the cylinder concentric to the tube 90, said bearing ring being welded to the cylinder for rotation therewith. The bearing means at 99 and 104 support the band-holding drum B so that it may readily be rotated by hand through an angle of 180° or more in either direction.

Any suitable means may be provided for supplying fluid to and for exhausting fluid from the tube 70. As herein shown, a horizontal metal pipe 107 extends through the tube 90 and is held concentric to the tube. One end of the pipe is connected to a conventional T-fitting 108 at one end of the tube 90 and the other end is connected to an air pump or other suitable source of air under pressure.

A pair of short pipes 112 are screwed into the T-fitting 108, and a pair of pipes 113 are welded to the cylinder 69 for receiving a pair of long flexible rubber hoses 114. The hoses are mounted on the ends of said pipes and are held thereon in a leak-proof manner by clamps 115. The pipes 113 are located at diametrically opposed locations on the cylinder 69 and supply air from the hoses 114 to the inlet openings 116 which communicate with the interior chamber 117 of the inflatable tube 70. The air is supplied to and exhausted from the chamber 117 through the opening 116, the hoses 114 and the pipe 107 as is apparent from the drawings. Suitable relief valves or the like may also be provided if desired to prevent the supplying of excessive air pressure. The air pressure should never exceed ten pounds per square inch gage, but the tube 70 may be reinforced by the cords 73 so as to withstand higher pressures without blowouts.

As shown in the drawings, the surface 80 has a diameter of around 33 inches when the tube 70 is deflated, the metal end rings 57 of the transfer cylinder have an internal diameter of around 45 inches, and the tire-building drum D has an external diameter of around 40 inches, but it will be apparent that these dimensions will vary depending on the size and type of tire being built. The deflated tube 70, for example, may have a length anywhere from five to ten feet or more depending on the size of the tire, and the transfer cylinder may have a length anywhere from three to seven feet or more.

When the apparatus shown in FIGS. 4 to 11 is operated, the preformed endless 2-ply bias-cut fabric band 3 is pulled over the rollers 83 of the toroidal ring to a central position on the band-holding drum B as shown in solid lines in FIG. 6. Air is then admitted to the tube 70 without rotating the tube until the tube is expanded to the position shown in dot-dash lines in FIG. 9. A fluid pressure in the neighborhood of about one pound per square inch gage may be sufficient for this initial expansion. This expansion may be to within an inch or less of the transfer cylinder, where the transfer cylinder is placed around the tube, but is preferably insufficient to press the band against the interior of the cylinder.

The initial expansion tends to expand the upper part of the band 3 more than the lower part below the tube due to the action of gravity. In order to equalize the spacing of the cords of the fabric, the tube 70 is deflated to reduce its diameter at least several inches so that the band 3 hangs like a loose belt, the drum B is rotated manually through an angle of 180° from its position during the initial inflation, and the tube is again inflated without rotating the tube (all of which operations can be performed in a few seconds). During the latter inflation, the band 3 and the transfer cylinder are located centrally of the tube 70 so that the band may be expanded into engagement with the cylinder.

The pressure applied during the latter expansion, which may be on the order of two or three pounds per square inch gage, is sufficient to press the band 3 tightly against the knurled surface 62 so as to remove the air from between said surface and said band and preferably is sufficient to bulge the end portions of the tube 70 to some extent as shown in FIGS. 7 and 8. The bulging of the tube insures that the band 3 is pressed tightly against the interior of the transfer cylinder at the ends of the cylinder and expands the end portions of the band 3 so that it is relatively easy to turn these end portions over the cylinder to form the cuffs 54. Pressures of four or five p.s.i. gage or even higher may be employed where the tube is reinforced so that it will not be damaged by these pressures, but lower pressures are usually satisfactory.

As soon as both cuffs 54 are formed, the tube 70 is deflated and the transfer cylinder A is moved axially to a position surrounding the tire-building drum where the band 3 may be applied to the tire being built on the drum as described in said Patent No. 2,871,912.

FIGURE 9 shows a modified inflatable bag constructed according to the present invention. This figure shows a portion of a tire building machine disclosed in more detail in my U.S. Patent No. 2,838,091 including a support 124 and a horizontal shaft 125 mounted in openings 150 in the upwardly extending portions 224 of said support and rigidly held in position by hexagonal nuts 152.

Bearings 154 are provided near the opposite ends of the shaft 125 for rotatably supporting a pair of hub members 220 adjacent the inner faces of the vertical portions of the bracket 124. A rigid metal cylinder 221 is rigidly connected to the hub members 220 by circumferentially spaced attaching bolts 222 near opposite ends of the shaft 125. An axially elongated, externally cylindrical, elastic, rubber, air bag 155 is mounted on the cylinder 221. The air bag is drawn substantially to scale in FIG. 9 so that its construction will be apparent from the drawings. The bag 155 preferably has an axial length in the normal and unstressed condition that is more than five times the radial depth of the bag, and as herein shown, has an axial length more than ten times its radial depth. The bag is held on the cylinder 221 by means of circumferentially continuous, inextensible, rubber coated, metal, bead rings 225 which fit in annular grooves 226 in the cylinder 221.

The cylinder 221 and the air bag 155 are constructed substantially the same near their opposite ends and are substantially symmetrical about their medial planes so that a description of half of the backup roll is all that is needed for a complete understanding of the construction. Each bead ring 225 is surrounded by a single strip of rubber-coated fabric which extends around the side walls of the bag and axially inwardly toward the center of the air bag. The inner portion of the rubber-impregnated strip extends from the bead 225 along the side wall of the bag to provide an inner, circumferentially continuous, fabric ply 227 having a substantially uniform width greater than the radial depth of the air bag in its normal unstressed condition and not substantially greater than twice said radial depth. The outer portion of the strip extends from the bead around the side walls of the air bag, engaging the inner ply 227 throughout its width and extends axially inwardly beyond the ends of said inner ply to form an outer circumferentially continuous fabric ply 228 having a substantially uniform width greater than that of the inner ply 227. The outer ply 228 may have a width from about two to five times the normal radial depth of the air bag and preferably has a width not in excess of about one-third the axial length of the air bag.

The air bag has an inner impervious tubular rubber layer 229 of substantially uniform thickness which completely covers the inside of the air bag and provides an annular air-tight chamber 230 within the air bag for receiving air under pressure. The side portions of the tubular layer 229 are vulcanized to and integrally connected to the fabric from each bead ring 225 to the end of each ply 228.

A conventional air inlet connection is provided for supplying air to the chamber 230 including a flanged metal inlet conduit 231 and an umbrella-shaped annular elastic rubber sealing member 232 that is vulcanized to and integrally joined to the tube 229 and to said conduit so as to prevent leakage from the chamber 230. A circular opening 233 is provided in the cylinder 221 to receive the conduit 231 and the tubular portion of the rubber seal 232 as indicated in FIG. 9.

An outer layer of elastic rubber 234 is vulcanized to the outer ply 228 from the layer 229 at the inner face of each bead 225 to the axially inner end of the ply 228 and is vulcanized to the outer central portion of the layer 229 between the inner ends of the plies 228 so as to cover completely the side walls of the bag and the outer portions of the fabric and the inner layer 229.

An annular elastic rubber tread layer 235 of substantially uniform axial length and substantially uniform radial thickness is vulcanized to the outer surface of the layer 234 to provide a normally externally cylindrical surface. The layer 235 extends the full length of the bag and has tapering end portions which provide tapering annular shoulders 236 at the opposite ends of the air bag substantially as indicated in FIG. 9.

The rubber layers 229, 234 and 235 may be made from conventional rubber tire compounds and are vulcanized together with the fabric plies 227 and 228 to provide an integral tubular air bag. It will be noted that the fabric reinforcement for the air bag terminates at the axially inner ends of the plies 228 so that the central portion of the bag between said plies consists only of rubber with a substantially uniform thickness.

Since the fabric plies 227 and 228 are connected to the inextensible bead rings 225 and effectively resist stretching of the rubber, such plies tend to hold in the side portions of the air bag so that the bag remains substantially cylindrical when it is filled with air and expanded. This is quite unlike ordinary automobile tires wherein the internal air chamber tends to become circular in cross-section when it is filled with air. The bag 155 of the present invention is so constructed that the chamber 230 does not approach circular cross-section but remains substantially cylindrical.

Since the bag shown in FIG. 9 remains cylindrical as it is expanded and contracted, it may be used in many different types of machines, for the example in the machine of my United States Patent No. 2,871,912 or in the machine of my United States Patent No. 2,838,091.

Figure 10:
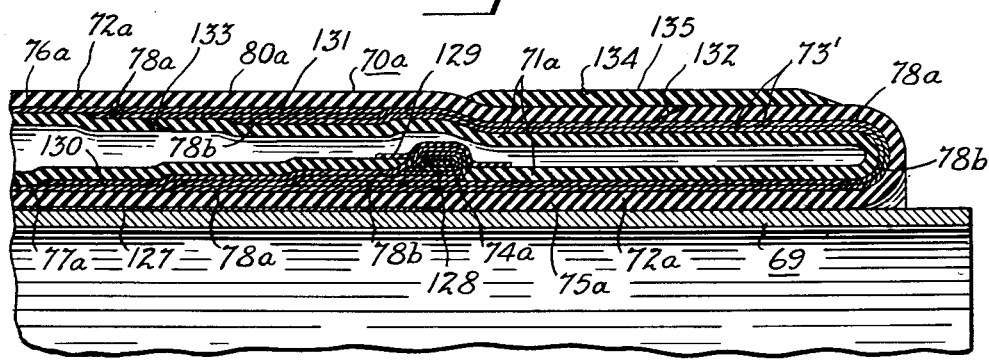
FIGURE 10 is a fragmentary longitudinal vertical sectional view on a reduced scale with parts omitted similar to FIG. 3 showing another modified form of inflation bag.

FIGURE 10 shows an annular inflatable tube or bag 70a mounted on the cylinder 69 to replace the bag 70 in the apparatus B described above. The bag 70a is equivalent to the bag 70 and extends substantially the full length of the cylinder 69. This bag, in the normal unstressed deflated condition shown in FIG. 10, comprises concentric cylindrical inner and outer parts integrally joined near the opposite ends of the cylinder 69. Said inner and outer parts are formed by inner and outer tubular elastic impervious vulcanized rubber layers 71a and 72a of substantially uniform thickness and a multiplicity of closely spaced reinforcing cords 73' sandwiched between and integrally joined to said layers. These cords are formed as conventional weftless fabric and are arranged parallel to the axis of the cylinder 69 (as indicated in FIG. 4) so that they do not interfere wtih radial expansion of the tube. The cords 73' extend axially the full length of the bag 70a and are closely spaced like the cords 73. There are provided around thirty to sixty cords 73' per inch of circumference.

The inner part of the bag 70a is held against the cylinder 69 by a pair of inextensible metal bead rings 74a, which (like the rings 74) are spaced from the ends of the deflated tube a predetermined distance substantially less than one-sixth the axial length of the deflated bag. In the bags 70 and 70a this distance, which may vary considerably, is usually about 2 to 6 times the radial height of the deflated tube or about 2 to 8 inches where the cylinder 69 has an external diameter of 1 to 4 feet. As herein shown, the center of each bead ring 74a is about four inches from the end of the cylinder 69 and about three and one-half inches from the end of the deflated bag 70a.

A continuous layer of cement 127 extends between the bead rings 74 to bond the bag 70a to the cylinder 69 throughout the circumference of the cylinder, said layer covering the entire area of the cylinder between the bead rings. The cement layer terminates at the bead rings so that the end portions 75a of the bag 70a are free to move away from the cylinder when the bag is inflated to permit radial expansion of the bag without stretching the cords 73'.

The reinforcing cords 73' are mounted in the bag 70a as indicated in FIG. 10 which is drawn substantially to scale. As shown herein the bag 70a is made from long single-ply fabric strips 76a and 77a and short single-ply end strips 78a and 78b which overlap said long strips. Each of the strips preferably contains 20 to 35 cord ends per inch of width. The long strips 76a and 77a and the cords 73' thereof have a length of more than six feet and extend the major portion of the length of the cylinder 69.

The end strips 78a and 78b are arranged as shown in FIG. 10, the edges of the strips 78a extending axially inwardly up to one inch beyond the edges of the strips 78b. The edges of said end strips are axially inwardly of the nearest bead ring 74a when the tube 70a is deflated. The end portion 131 of the strip 76a overlaps the two end strips 78a and 78b and terminates up to one inch axially outwardly of the edge of the strip 78b. The end portion of the strip 77a is turned radially outwardly and axially inwardly over the flipper strip 128 of the bead ring 74a to form a cuff 130 which overlies the radially inner portion of the strip, the edge of the cuff being spaced an inch or so radially inwardly of the edge of the strip 78a. A narrow gum strip 129 is provided to prevent exposure of the fabric surrounding the bead ring. It will be apparent from FIG. 10 that the arrangement of the edges of the fabric strips is such as to minimize the changes in thickness of the tube wall. The splices 132 and 133 in the portions 71a and 72a are skived and cemented to insure a proper bond.

It will be apparent that the fabric strips are not circumferentially continuous and that more than one circumferential splice is provided. A circumferential overlap of one-quarter inch between fabric strips is sufficient.

Both ends of the tube 70a are the same except that at one end only a relatively thick circumferential rubber strip 134 of substantially uniform thickness is vulcanized to the outer layer 72a near the axially outer end thereof. When the tube 70a is deflated, the strip 134 is located as indicated in FIG. 10, the cylindrical outer surface 135 thereof being of substantially the same diameter as the cylindrical outer surface 80a of the tube. The strip 134 is free of fabric reinforcement and does not interfere substantially with the radial expansion, but because of its thickness it resists bending and thereby limits axial movement of the radially outer part of the tube 70a relative to the cylinder 69. The strip 134, therefore, serves as a stabilizing means to prevent side sway.

The construction shown in FIG. 10 is preferred over that of FIG. 4 and is far superior to that shown in FIG. 9 particularly when a considerable amount of radial expansion is required.

Except for the thicknesses of the sheets, FIGS. 1 to 10 are drawn substantially to scale so that the relative sizes will be apparent to the eye. It will, of course, be obvious that the relative dimensions may be ten percent higher or lower than those shown.

The terms "radial height" and "radial depth" are used in the specification and claims in the normal sense to indicate the difference between the inside and outside diameters of the inflatable tube.

It will be noted that each of the inflatable bags or tubes 70, 70a and 155 when inflated has an axial length greater than and preferably at least twice its internal diameter and when deflated has an axial length which is usually at least ten times its radial height.

This application is a continuation-in-part of my copending application Serial No. 573,850, filed March 26, 1956, now Patent No. 2,871,912, and is a continuation-in-part of my copending application Serial No. 528,996, filed August 17, 1955, now Patent No. 8,838,091.

It will be understood that the above description is by way of illustration rather than limitation and that, in accordance with the provisions of the patent laws, variations and modifications of the specific devices and articles disclosed herein may be made without departing from the spirit of the invention.

Having described my invention, I claim:

1. In apparatus of the character described having a cylinder with an axial length greater than its external diameter, an inflatable elastic rubber tube of axially elongated cross section having means for mounting the tube on said cylinder, said tube when deflated having inner and outer cylindrical parts and when inflated and expanded radially having an axial length several times its radial height, a multiplicity of circumferentially closely spaced cords embedded in the walls of said tube generally parallel to the axis of said cylinder for reinforcing said tube, said tube being substantially free of circumferentially extending cords, and a pair of inextensible bead rings holding the inner cylindrical part of the tube against said cylinder, each bead ring being spaced inwardly 2 to 8 inches from the end of the tube when the tube is deflated, the end portions of the tube axially outwardly of the bead rings assuming generally cylindrical shapes when the tube is deflated, said cords reinforcing said end portions throughout the periphery thereof and resisting axial forces without restraining radial expansion of said end portions.

2. An inflatable tube as defined in claim 1 wherein the reinforcing cords embedded in the tube extend axially the full length of the tube to resist axial elongation of the tube.

3. An inflatable tube as defined in claim 1 wherein a relatively thick rubber strip with a width of 2 to 8 inches is vulcanized to the radially outer portion of the tube adjacent one end thereof to provide means for limiting axial movement of said outer portion relative to the radially inner portion of the tube.

4. In a tire-building apparatus, a rigid cylinder having an axial length at least twice its diameter, an inflatable tube of axially elongated cross section mounted on said cylinder, said tube when in the normal unstressed deflated condition comprising concentric cylindrical inner and outer parts integrally joined at the sides of the tube and spaced apart a distance not substantially greater than the radial thickness of the outer part, said inner and outer parts being formed by inner and outer tubular elastic rubber layers and a multiplicity of closely spaced reinforcing cords throughout the tube sandwiched between and integrally joined to said layers, said cords being generally parallel to the axis of said cylinder and free to separate circumferentially so as to permit radial expansion of the tube, and inextensible bead rings in the inner part of said tube near the opposite sides thereof, each bead ring being spaced inwardly from the nearest side of the deflated tube a distance less than one-sixth the axial length of the deflated tube, the end portions of said inner part being disconnected from said cylinder axially outwardly of said bead rings and moving away from said cylinder when the tube is inflated, said tube when inflated having a generally cylindrical outer surface and a radial height at least twice its radial height when deflated, the inflated tube having an axial length at least six times its radial height.

5. In a tire-building apparatus, a rigid axially elongated cylinder, an inflatable elastic rubber tube of axially elongated cross section mounted on said cylinder and having inner and outer cylindrical parts of an axial length greater than the external diameter of said cylinder, a multiplicity of circumferentially closely spaced cords generally parallel to the axis of said cylinder for reinforcing said tube, and a pair of inextensible bead rings adjacent the surface of said cylinder for holding the major portion of the inner cylindrical part against said cylinder, said bead rings being spaced apart a distance greater than their diameters and being spaced inwardly from the opposite ends of said inner part when the tube is in its expanded position to permit movement of the end portions of said inner part away from the cylinder when the deflated tube is inflated.

6. Apparatus as defined in claim 5 wherein a toroidal ring is mounted on the end of said rigid cylinder to facilitate mounting of an endless band of elastic material on the external surface of said tube, said ring being concentric to said cylinder and having an external diameter greater than the diameter of said tube when the tube is deflated and less than the diameter of said band.

7. Apparatus as defined in claim 6 wherein said ring comprises a rod of circular cross section and a multiplicity of closely spaced circular rollers mounted on said rod.

8. Apparatus as defined in claim 5 wherein the upper portion of said tube is covered with sheet metal to facilitate mounting of an endless band of elastic material around said tube.

9. Apparatus as defined in claim 5 wherein said rigid cylinder is mounted in cantilever fashion on a truck having a main frame portion below said tube and three ground-engaging wheels rotatably mounted on said frame portion, said truck having an upright standard with a horizontally extending portion for rotatably supporting said bag and said rigid cylinder above the ground.

10. An expansible and contractible tubular pneumatic bag comprising inextensible bead rings at opposite sides of the bag, rubber-impregnated fabric strips extending around said bead rings and forming adjacent inner and outer superposed circumferential plies extending around the side walls of the bag and axially inwardly toward the center of the bag and terminating short of said center, an inner tubular rubber layer integrally joined to the inner plies and forming an air-tight axially elongated annular air chamber, an outer rubber layer covering said bead rings and integrally joined to said outer plies and to said inner layer, said inner and outer rubber layers contacting each other and being free of fabric reinforcement along at least about one-third the axial length of said bag, and an exterior tread layer of elastic rubber of uniform thickness integrally joined to said outer layer and extending the length of said bag, said tread layer having a normally cylindrical outer surface with an axial length at least about five times the radial depth of said bag and said inner plies having a width not substantially greater than twice said radial depth.

11. An expansible and contractible tubular pneumatic bag comprising inextensible bead rings at opposite sides of the bag, rubber-impregnated fabric strips extending around said bead rings and forming adjacent inner and outer superposed circumferential plies extending around the side walls of the bag and axially inwardly toward the center of the bag and terminating short of said center, an inner tubular rubber layer integrally joined to the inner plies and forming an air-tight axially elongated annular air chamber, an outer rubber layer covering said bead rings and integrally joined to said outer plies and to said inner layer, said inner and outer rubber layers contacting each other and being free of fabric reinforcement along at least about one-third the axial length of said bag, and an exterior tread layer of elastic rubber of uniform thickness integrally joined to said outer rubber layer and extending the length of said bag, said tread layer having a normally cylindrical outer surface with an axial length at least about ten times the radial depth of said bag.

12. An expansible and contractible tubular pneumatic bag comprising inextensible bead rings at opposite sides of the bag, rubber-impregnated fabric strips extending around said bead rings and forming adjacent inner and outer superposed circumferential plies extending around the side walls of the bag and axially inwardly toward the center of the bag and terminating short of said center, an inner tubular rubber layer integrally joined to the inner plies and forming an air-tight axially elongated annular air chamber, an outer rubber layer covering said bead rings and integrally joined to said outer plies and to said inner layer, said inner and outer layers contacting each other and being free of fabric reinforcement along at least about one-third the axial length of said bag, and an exterior tread layer of elastic rubber of uniform thickness integrally joined to said outer layer and extending the length of said bag, said tread layer having a normally cylindrical outer surface with an axial length at least several times the radial depth of said bag and said inner and outer plies having widths less than about one-third said axial length.

13. An endless tubular elastic rubber air bag having inextensible annular bead portions, fabric-reinforced side wall portions, of substantially arcuate cross-section, and a normally cylindrical tread portion extending between said side wall portions and having an axial length that is greater than ten times the radial depth of said side wall portions, said tread portion having an extensible central portion that is free of fabric reinforcement, said portion having an axial length materially greater than said radial depth.

14. An inflatable elastic tube having an axial length when inflated several times its external diameter, said tube having inner and outer parts defining an annular air chamber, means for supporting said inner part, said inner and outer parts having cylindrical shapes and being concentric when the tube is deflated, a multiplicity of closely spaced cords embedded in said inner and outer parts generally parallel to the axis of the tube throughout the periphery of the tube for reinforcoing the tube, the opposite end portions of said inner part being free to move radially outwardly to permit radial expansion of the tube and the major portion of said inner part being held against radial movement on the supporting means, said cords being provided throughout the length and circumference of the tube to prevent substantial radial elongation of said inner and outer parts while permitting free radial expansion thereof.

15. An inflatable tube as defined in claim 14 having an axial length which is at least 10 times its radial height when deflated.

16. An annular cord-reinforced inflatable elastic rubber article for mounting on a rigid axially elongated metal cylinder, said article when in the normal unstressed, deflated condition comprising concentric cylindrical inner and outer parts integrally joined at the sides of the tube and spaced apart a distance not susbtantially greater than the radial thickness of the outer part, said inner and outer parts being formed by inner and outer tubular elastic rubber layers and a multiplicity of closely spaced reinforcing cords sandwiched between and integrally joined to said layers, said cords being generally parallel to the axis of the annular article and being arranged to permit radial expansion of the tube, and inextensible bead rings in the inner part of said article near the opposite sides thereof and spaced apart a distance greater than their diameters, each bead ring being spaced axially inwardly from the nearest side of the deflated article a distance less than one-sixth the axial length of the deflated article and sufficient to enable the article to maintain a generally cylindrical external surface as it is inflated, said cords extending around the expanded portions of the article from a bead ring near one end of the expanded article to the bead ring near the opposite end of the article said inner parts being disconnected from said cylinder axially outwardly of said bead rings and moving away from said cylinder when the tube is inflated to provide expansible side walls for the article, said article having a generally cylindrical outer surface when inflated and having a radial height when inflated at least twice its radial height when deflated, the inflated article having an axial length several times its radial height.

17. An article as defined in claim 16 comprising a tube having an axially continuous inner cylindrical wall for engaging the rigid cylinder between said bead rings, the inflated article having an axial length at least six times its radial height.

References Cited in the file of this patent

UNITED STATES PATENTS

| | | |
|---|---|---|
| 1,286,107 | Renner | Nov. 26, 1918 |
| 1,588,585 | Kearns | June 15, 1926 |
| 1,643,202 | Denmire | Sept. 20, 1927 |
| 2,084,009 | Sohl | June 15, 1937 |
| 2,517,889 | Kuffler | Aug. 8, 1950 |
| 2,521,143 | Benson | Sept. 5, 1950 |
| 2,653,645 | Frazier | Sept. 29, 1953 |
| 2,698,042 | Perkins | Dec. 28, 1954 |
| 2,731,063 | Powers | Jan. 17, 1956 |
| 2,822,025 | Hollis | Feb. 4, 1958 |